United States Patent
Ghosh et al.

(10) Patent No.: US 9,161,063 B2
(45) Date of Patent: Oct. 13, 2015

(54) SYSTEM AND METHOD FOR LOW BANDWIDTH DISPLAY INFORMATION TRANSPORT

(75) Inventors: Subir Ghosh, San Jose, CA (US); Gabriele Sartori, Fremont, CA (US)

(73) Assignee: nComputing, Inc., Santa Clara, CA (US)

(*) Notice: Subject to any disclaimer, the term of this patent is extended or adjusted under 35 U.S.C. 154(b) by 973 days.

(21) Appl. No.: 12/395,152

(22) Filed: Feb. 27, 2009

(65) Prior Publication Data

US 2009/0303156 A1 Dec. 10, 2009

Related U.S. Application Data

(60) Provisional application No. 61/067,516, filed on Feb. 27, 2008.

(51) Int. Cl.
*G09G 5/00* (2006.01)
*H04N 21/2343* (2011.01)
(Continued)

(52) U.S. Cl.
CPC .. *H04N 21/234309* (2013.01); *G06F 17/30905* (2013.01); *H04N 19/70* (2014.11); *H04N 21/2358* (2013.01); *H04N 21/4113* (2013.01); *H04N 21/4122* (2013.01); *H04N 21/42607* (2013.01); *H04N 21/42653* (2013.01);
(Continued)

(58) Field of Classification Search
CPC .............................................. H04N 21/234309
USPC ........................................................ 345/1.2
See application file for complete search history.

(56) References Cited

U.S. PATENT DOCUMENTS 5,469,223 A 11/1995 Kimura
5,859,651 A 1/1999 Potu
(Continued)

FOREIGN PATENT DOCUMENTS

TW I287195 B 9/2007
TW I291293 B 12/2007
(Continued)

OTHER PUBLICATIONS

"U.S. Appl. No. 12/908,365, Response filed Jun. 18, 2013 to Non Final Office Action mailed Mar. 28, 2013", 11 pgs.
(Continued)

*Primary Examiner* — William C Vaughn, Jr.
*Assistant Examiner* — Luis Perez Fuentes
(74) *Attorney, Agent, or Firm* — Schwegman Lundberg & Woessner, P.A.

(57) ABSTRACT

A digital video transmission system that operates with three different video rendering paths. A first rendering path operates by receiving display requests and rendering bit-mapped graphics in a local screen buffer. The display information in that local screen buffer is then encoded and transmitted to a remote display system that recreates the content of that local screen buffer in a video buffer of remote display system. A second rendering path operates by receiving encoded video stream requests that can be decoded by the remote display system. Such encoded video streams are sent to the remote display system with minimal addition transport encoding. The third rendering path handles encoded video streams that cannot be handled natively by the remote display system. Such video streams may be either transcoded before transmission or decoded and stored within the local screen buffer.

20 Claims, 5 Drawing Sheets

(51) Int. Cl.
*H04N 21/443* (2011.01)
*G06F 17/30* (2006.01)
*H04N 19/70* (2014.01)
*H04N 21/235* (2011.01)
*H04N 21/41* (2011.01)
*H04N 21/426* (2011.01)
*H04N 21/45* (2011.01)
*H04N 21/454* (2011.01)
*H04N 21/462* (2011.01)

(52) U.S. Cl.
CPC ........... *H04N21/443* (2013.01); *H04N 21/454* (2013.01); *H04N 21/4516* (2013.01); *H04N 21/4621* (2013.01)

(56) References Cited

U.S. PATENT DOCUMENTS

| | | | |
|---|---|---|---|
| 6,014,125 | A | 1/2000 | Herbert |
| 6,247,050 | B1 * | 6/2001 | Tso et al. ............... 709/224 |
| 6,278,645 | B1 | 8/2001 | Buckelew et al. |
| 6,313,822 | B1 * | 11/2001 | McKay et al. ............... 345/698 |
| 6,362,836 | B1 * | 3/2002 | Shaw et al. ............... 715/744 |
| 6,411,333 | B1 * | 6/2002 | Auld et al. ............... 348/441 |
| 6,448,974 | B1 | 9/2002 | Asaro et al. |
| 6,563,517 | B1 * | 5/2003 | Bhagwat et al. ............... 715/735 |
| 6,614,486 | B2 | 9/2003 | Hu |
| 6,674,479 | B2 | 1/2004 | Cook et al. |
| 6,753,865 | B1 | 6/2004 | Conklin et al. |
| 7,028,025 | B2 * | 4/2006 | Collins ............... 1/1 |
| 7,126,993 | B2 * | 10/2006 | Kitamura et al. ......... 375/240.26 |
| 7,127,525 | B2 * | 10/2006 | Coleman et al. ............... 709/247 |
| 7,191,462 | B1 * | 3/2007 | Roman et al. ............... 725/98 |
| RE39,898 | E | 10/2007 | Nally et al. |
| 7,484,236 | B2 * | 1/2009 | Alao et al. ............... 725/105 |
| 7,526,134 | B2 * | 4/2009 | Matsubara ............... 382/232 |
| 7,864,186 | B2 * | 1/2011 | Robotham et al. ............... 345/581 |
| 7,876,378 | B1 | 1/2011 | Lew et al. |
| 8,074,248 | B2 * | 12/2011 | Sigmon et al. ............... 725/110 |
| 8,090,046 | B2 * | 1/2012 | Yang et al. ............... 375/295 |
| 8,131,816 | B2 * | 3/2012 | Robinson et al. ............... 709/217 |
| 8,131,817 | B2 * | 3/2012 | Duursma et al. ............... 709/217 |
| 8,694,684 | B2 * | 4/2014 | Verzunov et al. ............... 709/247 |
| 8,723,891 | B2 | 5/2014 | Chowdhry et al. |
| 8,907,987 | B2 | 12/2014 | Chowdhry et al. |
| 2003/0030653 | A1 | 2/2003 | Swan et al. |
| 2004/0062309 | A1 | 4/2004 | Romanowski et al. |
| 2004/0228365 | A1 * | 11/2004 | Kobayashi ............... 370/477 |
| 2005/0021726 | A1 * | 1/2005 | Denoual ............... 709/223 |
| 2005/0025238 | A1 | 2/2005 | Uetani et al. |
| 2006/0028583 | A1 | 2/2006 | Lin et al. |
| 2006/0061582 | A1 | 3/2006 | Kurupati et al. |
| 2006/0282855 | A1 * | 12/2006 | Margulis ............... 725/43 |
| 2007/0097142 | A1 | 5/2007 | Gies |
| 2009/0066716 | A1 | 3/2009 | Meulen et al. |
| 2009/0128572 | A1 | 5/2009 | Macinnis et al. |
| 2011/0080519 | A1 | 4/2011 | Chowdhry et al. |

FOREIGN PATENT DOCUMENTS

| | | |
|---|---|---|
| TW | I291622 B | 12/2007 |
| TW | 200948087 A1 | 11/2009 |
| WO | WO-2009108345 A2 | 9/2009 |
| WO | WO-2009108345 A3 | 12/2009 |

OTHER PUBLICATIONS

"Chinese Application Serial No. 200980113099.3, Response filed Apr. 11, 2013 to Office Action mailed Aug. 26, 2012", with English translation of claims, 13 pgs.

"International Application Serial No. PCT/US2011/057089, International Preliminary Report on Patentability mailed May 2, 2013", 6 pgs.

"U.S. Appl. No. 12/861,217, Non Final Office Action mailed Apr. 1, 2013", 42 pgs.

"U.S. Appl. No. 12/908,365, Non Final Office Action mailed Mar. 28, 2013", 18 pgs.

"U.S. Appl. No. 12/908,365, Preliminary Amendment mailed", 3 pgs.

"International Application Serial No. PCT/US2011/057089, Search Report Mailed Jan. 23, 2012", 4 pgs.

"International Application Serial No. PCT/US2011/057089, Written Opinion Mailed Jan. 23, 2012", 4 pgs.

"Chinese Application Serial No. 200980113099.3, Office Action mailed Sep. 26, 2012", EN Office Action Only, 7 pgs.

"International Application Serial No. PCT/US2009/01239 International Search Report mailed Apr. 21, 2009", 4 pgs.

"International Application Serial No. PCT/US2009/01239 Written Opinion mailed Apr. 21, 2009", 4 pgs.

"International Application Serial No. PCT/US2009/001239, International Preliminary Report on Patentability mailed Sep. 10, 2010", 7 pgs.

"U.S. Appl. No. 12/861,217 , Response filed Jun. 19, 2013 to Non Final Office Action mailed Apr. 1, 2013", 17 pgs.

"U.S. Appl. No. 12/861,217, Examiner Interview Summary mailed Nov. 18, 2013", 3 pgs.

"U.S. Appl. No. 12/861,217, Final Office Action mailed Sep. 9, 2013", 62 pgs.

"U.S. Appl. No. 12/861,217, Notice of Allowance mailed Nov. 29, 2013", 19 pgs.

"U.S. Appl. No. 12/861,217, Response filed Nov. 18, 2013 to Final Office Action mailed Sep. 9, 2013", 17 pgs.

"U.S. Appl. No. 12/908,365 , Response filed Nov. 27, 2013 to Final Office Action mailed Sep. 3, 2013", 11 pgs.

"U.S. Appl. No. 12/908,365, Final Office Action mailed Sep. 3, 2013", 21 pgs.

"Chinese Application Serial No. 200980113099.3, Office Action mailed Jul. 31, 2013", with English translation, 12 pgs.

U.S. Appl. No. 12/908,365, Non Final Office Action mailed May 22, 2014, 24 pgs.

U.S. Appl. No. 12/908,365, Examiner Interview Summary mailed Oct. 14, 2014, 3 pgs.

U.S. Appl. No. 12/908,365, Final Office Action mailed Sep. 26, 2014, 24 pgs.

U.S. Appl. No. 12/908,365, Notice of Allowance mailed Oct. 24, 2014, 9 pgs.

U.S. Appl. No. 12/908,365, Response filed Sep. 19, 2014 to Non-Final Office Action mailed May 22, 2014, 14 pgs.

U.S. Appl. No. 12/908,365, Response filed Oct. 14, 2014 to Final Office Action mailed Sep. 26, 2014, 10 pgs.

Taiwanese Application Serial No. 098106489, Office Action mailed Feb. 26, 2015, 8 pgs.

\* cited by examiner

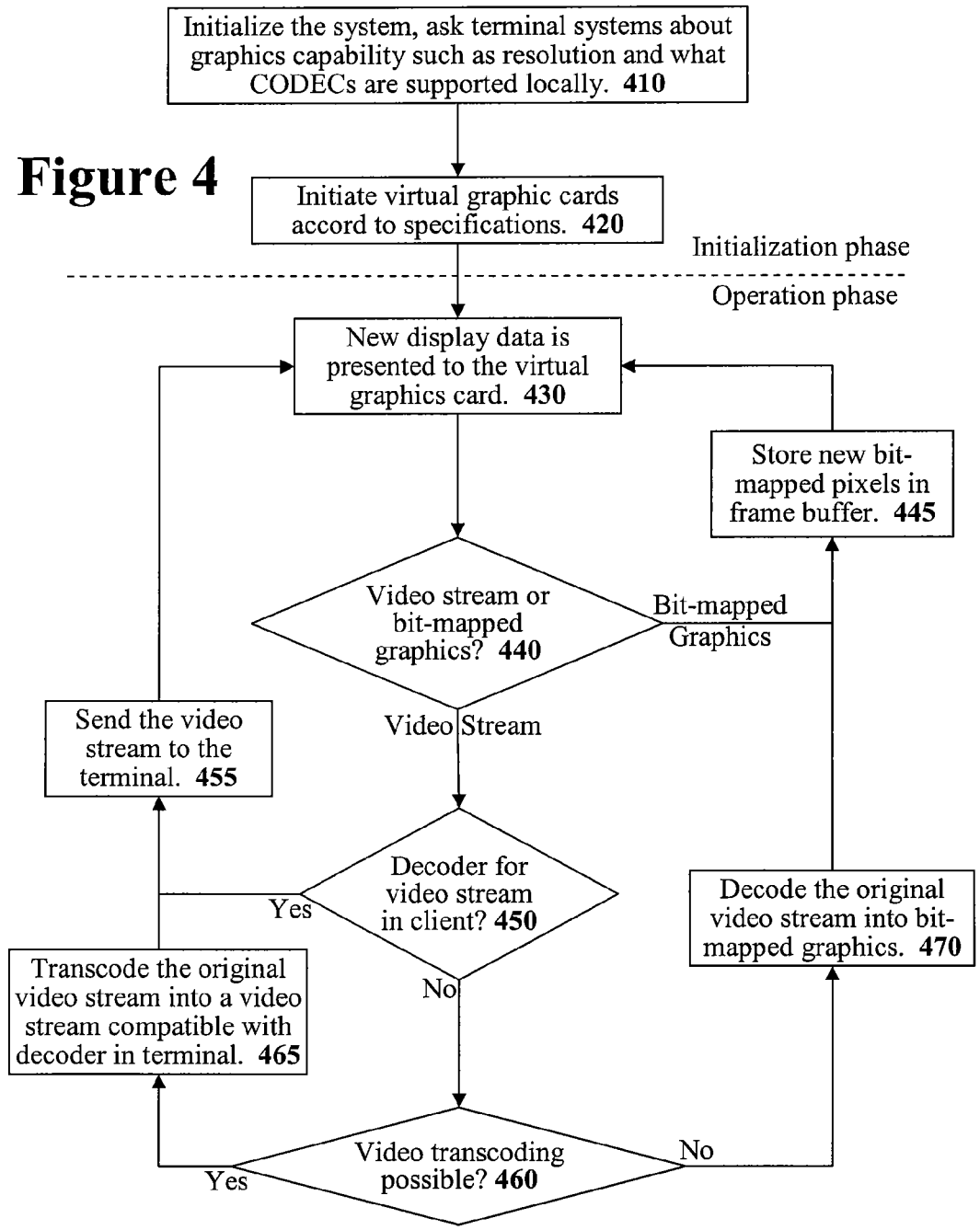

… (1) …

SYSTEM AND METHOD FOR LOW BANDWIDTH DISPLAY INFORMATION TRANSPORT

CROSS REFERENCE TO RELATED APPLICATIONS

This application claims the benefit of U.S. Provisional Patent Application Ser. No. 61/067,516 filed Feb. 27, 2008 ("SYSTEM AND METHOD FOR LOW BANDWIDTH DISPLAY INFORMATION TRANSPORT"), which application is incorporated herein by reference in its entirety.

TECHNICAL FIELD

The present invention relates to the field of thin-client systems. In particular, but not by way of limitation, the present invention discloses techniques for encoding video for thin-client terminal systems.

BACKGROUND

Centralized computer systems with multiple terminal systems for accessing the centralized computer systems were once the dominant computer architecture. These mainframe or mini-computer systems were shared by multiple computer users wherein each computer user had access to a terminal system coupled to the mainframe computer.

In the late 1970s and early 1980s, semiconductor microprocessors and memory devices allowed the creation of inexpensive personal computer systems. Personal computer systems revolutionized the computing industry by allowing each individual computer user to have access to their own full computer system. Each personal computer user could run their own software applications and did not need to share any of the personal computer's resources with any other computer user.

Although personal computer systems have become the dominant form of computing, there has been a resurgence of the centralized computer with multiple terminals form of computing. Terminal systems can have reduced maintenance costs since terminal users cannot easily introduce viruses into the main computer system or load in unauthorized computer programs. Furthermore, modern personal computer systems have become so powerful that the computing resources in these modern personal computer systems generally sit idle for the vast majority of the time.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

FIG. 4 illustrates a flow diagram describing the operation of the improved server and client video system illustrated in FIG. 3.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. For example, although the example embodiments are mainly disclosed with reference to a thin-client system, the teachings can be used in other environments. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
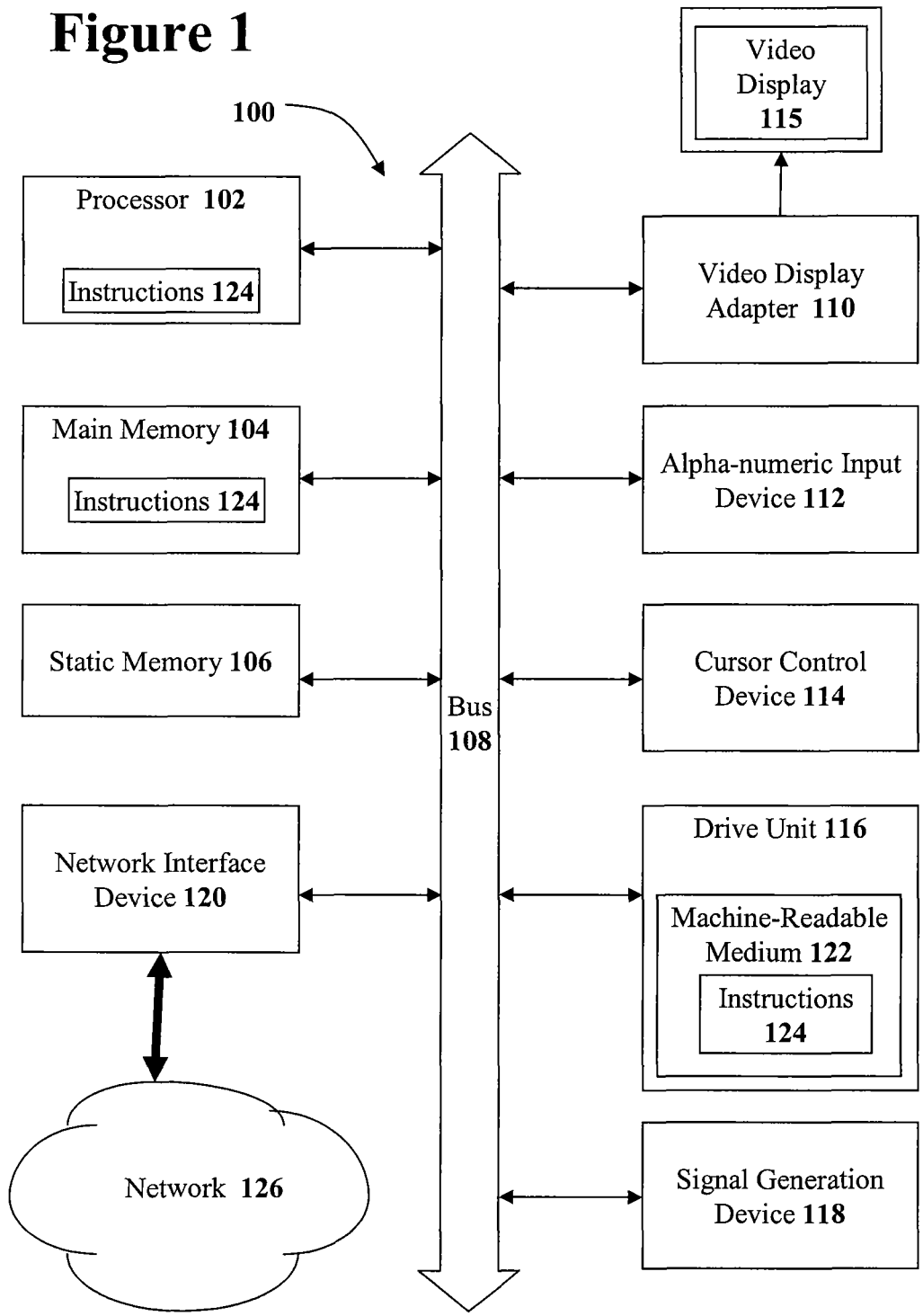
FIG. 1 illustrates a diagrammatic representation of machine in the example form of a computer system within which a set of instructions, for causing the machine to perform any one or more of the methodologies discussed herein, may be executed.

The present disclosure concerns computer systems. FIG. 1 illustrates a diagrammatic representation of machine in the example form of a computer system 100 that may be used to implement portions of the present disclosure. Within computer system 100 there are a set of instructions 124 that may be executed for causing the machine to perform any one or more of the methodologies discussed herein. In a networked deployment, the machine may operate in the capacity of a server machine or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of computer instructions (sequential or otherwise) that specify actions to be taken by that machine. Furthermore, while only a single machine is illustrated, the term "machine" shall also be taken to include any collection of machines that individually or jointly execute a set (or multiple sets) of instructions to perform any one or more of the methodologies discussed herein.

The example computer system 100 includes a processor 102 (e.g., a central processing unit (CPU), a graphics processing unit (GPU) or both), a main memory 104 and a static memory 106, which communicate with each other via a bus 108. The computer system 100 may further include a video display adapter 110 that drives a video display system 115 such as a Liquid Crystal Display (LCD) or a Cathode Ray Tube (CRT). The computer system 100 also includes an alphanumeric input device 112 (e.g., a keyboard), a cursor control device 114 (e.g., a mouse or trackball), a disk drive unit 116, a signal generation device 118 (e.g., a speaker) and a network interface device 120.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable media.

The instructions 124 may further be transmitted or received over a computer network 126 via the network interface device 120. Such transmissions may occur utilizing any one of a number of well-known transfer protocols such as the well known File Transport Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, and magnetic media.

For the purposes of this specification, the term "module" includes an identifiable portion of code, computational or executable instructions, data, or computational object to achieve a particular function, operation, processing, or procedure. A module need not be implemented in software; a module may be implemented in software, hardware/circuitry, or a combination of software and hardware.

The Resurgence of Terminal Systems

Before the advent of the inexpensive personal computer, the computing industry largely used mainframe or mini-computers that were coupled to many "dumb" terminals. Such terminals are referred to as 'dumb' terminals since the computing ability resided within the mainframe or mini-computer and the terminal merely displayed an output and accepted alpha-numeric input. No user applications ran locally on the terminal system. Computer operators shared the mainframe computer to multiple individual users that each used individual terminals coupled to the mainframe computer. These terminal systems generally had very limited graphic capabilities and were mostly visualizing only alpha-numeric characters on the display screen of the terminal.

With the introduction of the modern personal computer system, the use of dumb terminals largely disappeared since personal computer systems were much more cost effective. If the services of a dumb terminal were required to interface with a legacy terminal based computer system, a personal computer could easily emulate the operations of a dumb terminal at a cost very similar to the cost of a dedicated dumb terminal.

During the personal computer revolution, personal computers introduced high resolution graphics to personal computer users. Such high-resolution graphics allowed for much more intuitive computer user interfaces than a text-only display. For example, all current user interfaces that use multiple different windows, icons, and pull-down menus are implemented in high resolution graphics. Furthermore, high-resolution graphics allowed for applications that used photos, videos, and graphical images.

In recent years, a new generation of terminal systems have been introduced into the computer market as people have rediscovered some of the advantages of a terminal based computer systems. For example, computer terminals allow for greater security and reduced maintenance costs since users of computer terminal systems cannot easily introduce computer viruses by downloading or installing new software. Only the main computer server system needs to be closely monitored in terminal-based computer system. This new generation of computer terminal systems includes high-resolution graphics capabilities, audio output, and cursor control system (mouse, trackpad, trackball, etc.) input that personal computer users have become accustomed to.

Modern terminal-based computer systems allow multiple users at individual high-resolution terminal systems to share a single personal computer system and all of the application software installed on that personal computer system. In this manner, a modern high-resolution terminal system is capable of delivering nearly the full functionality of a personal computer system to each user without the cost and the maintenance requirements of an individual personal computer system for each user. A category of these modern terminal systems is called "thin client" systems since the terminal systems are designed to be very simple and limited (thus "thin") and thus primarily depend on a thin-client server system for application processing activities. The thin-client terminal system thus mainly focuses only on conveying input and output between the user and the centralized server system. Note that although the techniques set forth this document will be disclosed with reference to thin-client terminal systems, the techniques described herein are applicable in other area of the IT industry as well. For example, any system that remotely displays video information can use the teachings disclosed in this document.

A Thin-Client System

Figure 2A:
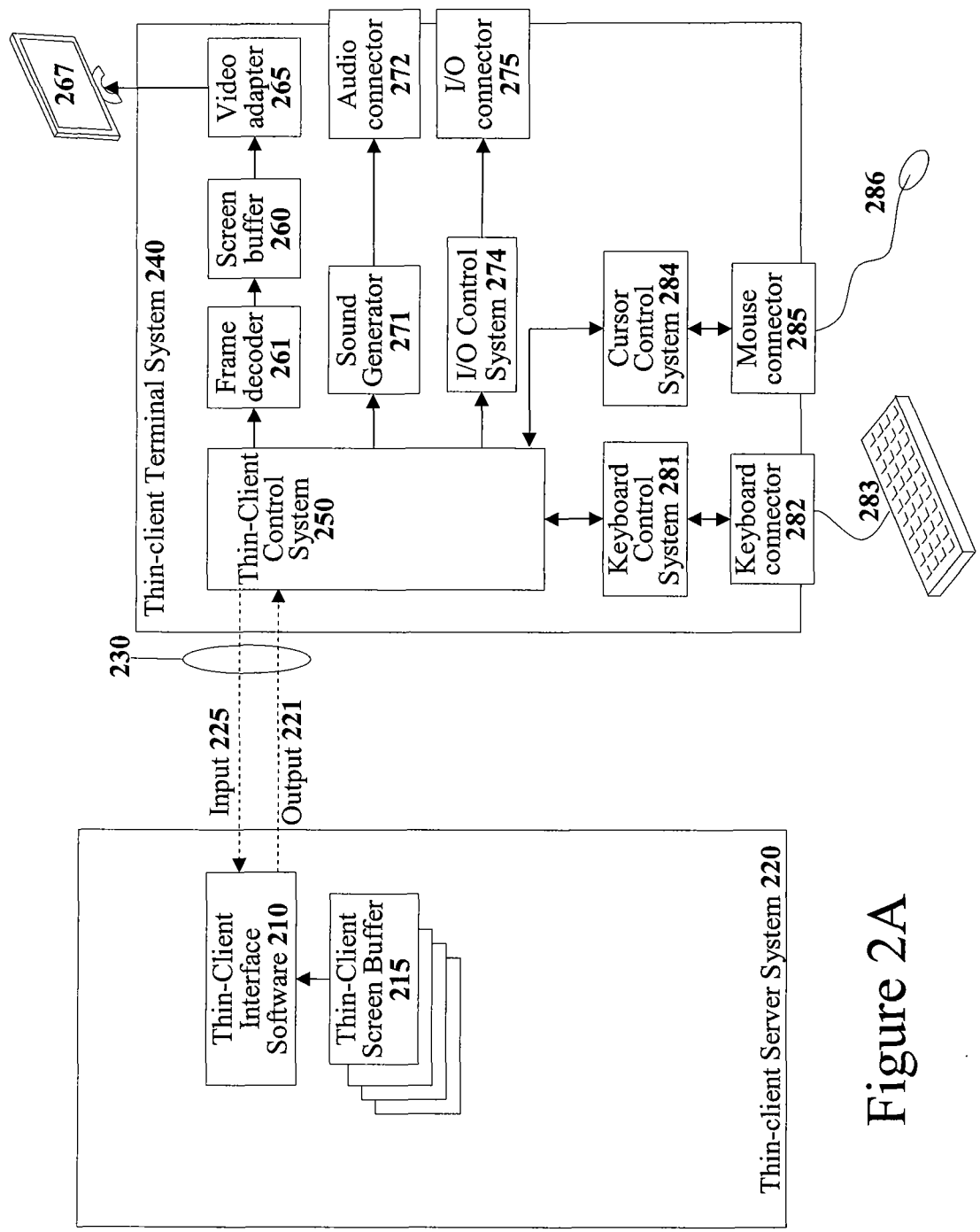
FIG. 2A illustrates a high-level block diagram of one embodiment of a thin-client terminal system coupled to a thin-client server computer system.

FIG. 2A illustrates a high-level block diagram of one embodiment of a thin-client server computer system 220 coupled to one (of possibly many) thin-client terminal system 240. The thin-client server computer system 220 and thin-client terminal system 240 are coupled to a with a bi-directional digital communications channel 230 that may be a serial data connection, an Ethernet connection, or any other suitable bi-directional digital communication means.

Figure 2B:
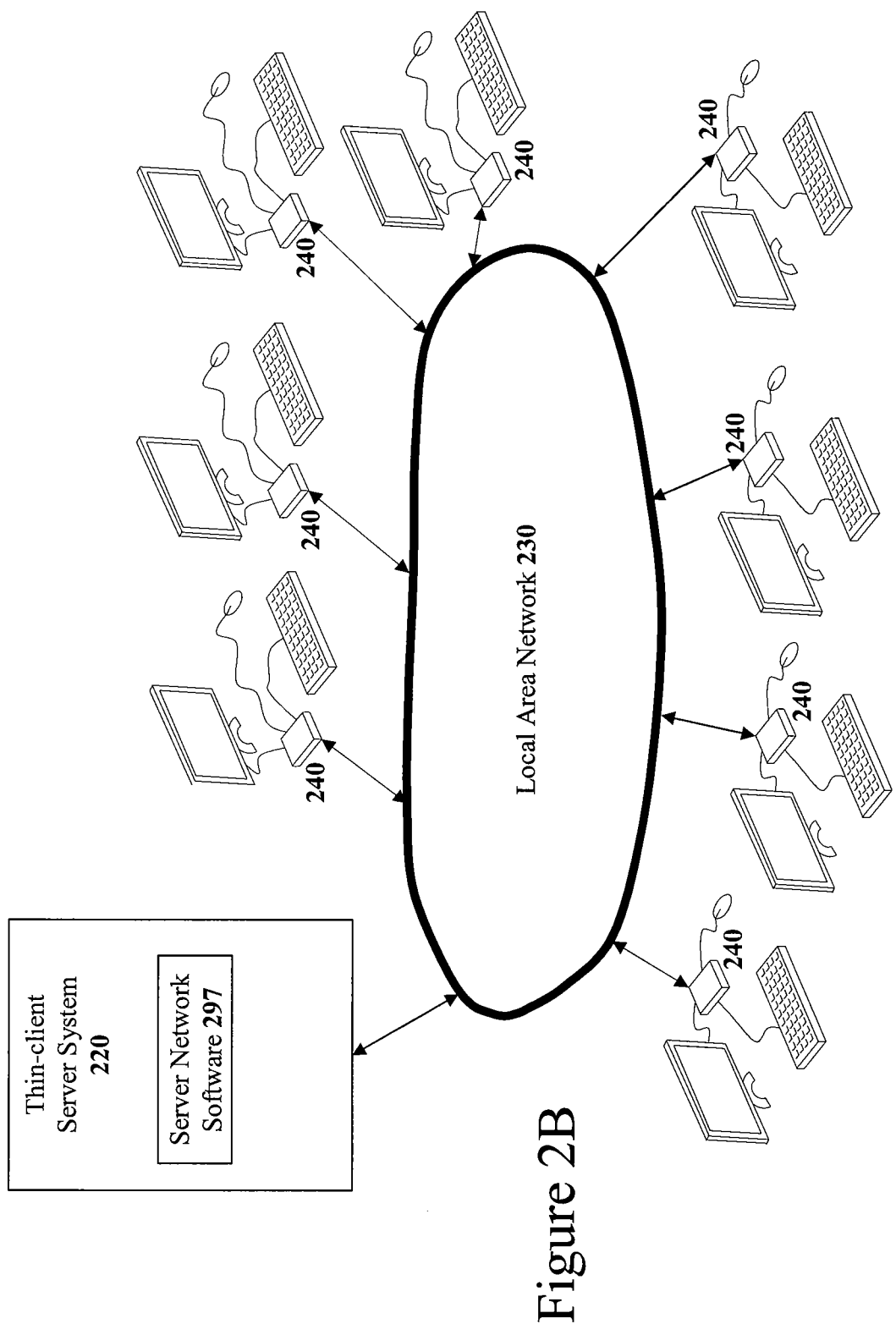
FIG. 2B illustrates a high-level block diagram of a single thin-client server computer system supporting multiple individual thin-client terminal systems using a local area network.

FIG. 2B illustrates a conceptual diagram of one embodiment of a thin-client environment. Referring to FIG. 2B, a single thin-client server computer system 220 provides computer processing resources to many thin-client terminal systems 240. In the embodiment of FIG. 2B, each of the individual thin-client terminal systems 240 is coupled to the thin-client server computer system 220 using local area network 230 as a bidirectional communication channel.

The goal of thin-client terminal system 240 is to provide most or all of the standard input and output features of a personal computer system to the user of the thin-client terminal system 240. However, this goal is to be achieved without providing the full computing resources or software of a personal computer system within thin-client terminal system 240 since those features will be provided by the thin-client server system 220 that will interact with the thin-client terminal system 240.

Referring back to FIG. 2A, the thin-client terminal system 240 provides both visual and auditory output using a high-resolution video display system and an audio output system. The high-resolution video display system consists of a frame decoder 261, a screen buffer 260, and a video adapter 265. The frame decoder 261 decodes digital video information from the associated thin-client screen buffer 215 in the server and places that digital video information into screen buffer 260 thus making screen buffer 260 a copy of the bit-mapped display information in thin-client screen buffer 215. Video adapter 265 reads the video display information out of screen buffer 260 and generates a video display signal to drive display system 267. The screen buffer 260 is filled with video display information provided by thin-client control system 250 using video information sent as output 221 by the thin-client server system 220 across bi-directional communications channel 230. Specifically, the video frame encoder 217 in the thin-client server system 220 sends information from a thin-client screen buffer 215 to the thin-client terminal system 240 so that the thin-client terminal system 240 can create a copy in its screen buffer 260.

The audio sound system of thin-client terminal system 240 operates in a similar manner. The audio system consists of a sound generator 271 coupled to an audio connector 272 for creating a sound signal. The sound generator 271 is supplied with audio information thin-client control system 250 using audio information sent as output 221 by the thin-client server system 220 across bi-directional communications channel 230.

From an input perspective, thin-client terminal system 240 allows for both alpha-numeric input and cursor control input from a terminal system user to be supplied to the thin-client computer system 220. The alpha-numeric input is provided by a keyboard 283 coupled to a keyboard connector 282 that supplies signals to a keyboard control system 281. Thin-client control system 250 encodes keyboard input from keyboard control system 281 and sends that keyboard input as input 225 to the thin-client server system 220. Similarly, the thin-client control system 250 encodes cursor control input from cursor control system 284 and sends that cursor control input as input 225 to the thin-client server system 220. The cursor control input is received through a mouse connector 285 from a computer mouse 285 or any other suitable cursor control device such as a trackball, trackpad, etc.

The thin-client terminal system 240 may include other input, output, or combined input/output systems in order to provide additional functionality to the user of the thin-client terminal system 240. For example, the thin-client terminal system 240 illustrated in FIG. 2A includes input/output control system 274 coupled to input/output connector 275. Input/output control system 274 may be a Universal Serial Bus (USB) controller and input/output connector 275 may be a USB connector in order to provide Universal Serial Bus (USB) capabilities to the user of thin-client terminal system 240.

Thin-client server computer system 220 is equipped with multi-tasking software for interacting with multiple thin-client systems. As illustrated in FIG. 2A, thin-client interface software 210 in thin-client server system 220 supports the thin-client terminal system 240 as well as any other thin-client terminal systems coupled to thin-client server system 220. Each thin-client terminal system 240 will have its own screen buffer in the thin-client server system 220 such as thin-client terminal screen buffer 215.

Transporting Video Information to Terminal Systems

The bandwidth required to deliver an entire high-resolution video frame buffer can be quite large. In an environment wherein a shared computer network is used to transport the video display information such as thin-client environment of FIG. 2B, the large amount of video display information transmitted to each thin-client terminal system 240 can adversely impact the computer network 230. When the applications running on the thin-client server system 220 are typical office software applications (such as word processors, databases, spreadsheets, etc.) then there are some simple methods that can be used to decrease the amount of video display information that must be delivered over the computer network 230 while maintaining a quality user experience for each terminal system user. For example, the thin-client server system 220 may only send video information across the computer network 230 to a thin-client terminal system 240 when the video display information for that specific thin-client terminal system 240 changes. In this manner, when the display screen for a thin-client terminal system is static, no information needs to be transmitted to that thin-client terminal system.

So as long as the software applications run by the users of thin-client terminal systems do not change the display screen information very frequently, then the thin-client system illustrated in FIG. 2A will work adequately. However, if some thin-client terminal system users run software applications that display full-motion video to the display screen, the volume of network traffic over the computer network 230 will increase greatly. If several users run applications that display full-motion video then the bandwidth requirements for the communication channel 230 can become quite formidable such that data packets may be dropped. Dropped packets will greatly decrease the user experience.

Difficulty of Transporting Full Motion Video Information to Terminal Systems

When full motion video is transmitted digitally, video compression systems can be used to minimize the amount of bandwidth need to transport the video information. The full motion video can be encoded (compressed) at the origination site, transmitted in its encoded form across a digital communication channel (such as a computer network), decoded (decompressed) at the destination site, and then displayed on a display system at the destination site. Many digital video encoding systems exist such as MPEG-1, MPEG-2, MPEG-4, and H.264. These digital video encoding systems are used in digital satellite television systems, DVDs, terrestrial HDTV transmission systems, and digital cable systems.

Implementing digital video encoding and digital video decoding systems is relatively easy on modern personal computer systems since there is plenty of processing power and memory capacity available for the task. However, in a thin-client terminal system environment one of the primary goals is to keep the thin-client terminal systems as simple and inexpensive as possible. Thus, configuring a thin-client terminal system with the processing power, memory, and software to handle digital video decoding in the same manner as it is typically done within a personal computer system may not be practical. A thin-client terminal system that could handle digital video decoding in such a manner might require a large amount of memory in order to buffer the incoming digital video data and processing power to execute the sophisticated digital video decoder routines such that the thin-client terminal system might become too expensive. Furthermore, to accommodate multiple decoders on a thin-client terminal system would require storage space, dynamic update capabilities, code compatibility, and other resources that would make the development a huge task.

Implementing Full Motion Video Decoders in Terminal Systems

To implement full-motion digital video decoding in thin-client terminal systems, the present disclosure proposes incorporating one or more inexpensive video decoders into a terminal system. These inexpensive video decoders may be discrete integrated circuits, licensed intellectual property implemented within an application specific integrated circuit (ASIC), or in another form. Video decoding for other video encoding systems may be handled with transcoding. In this manner a low cost thin-client terminal systems that handles a wide variety of video encoding systems can be implemented at a low cost.

Figure 3:
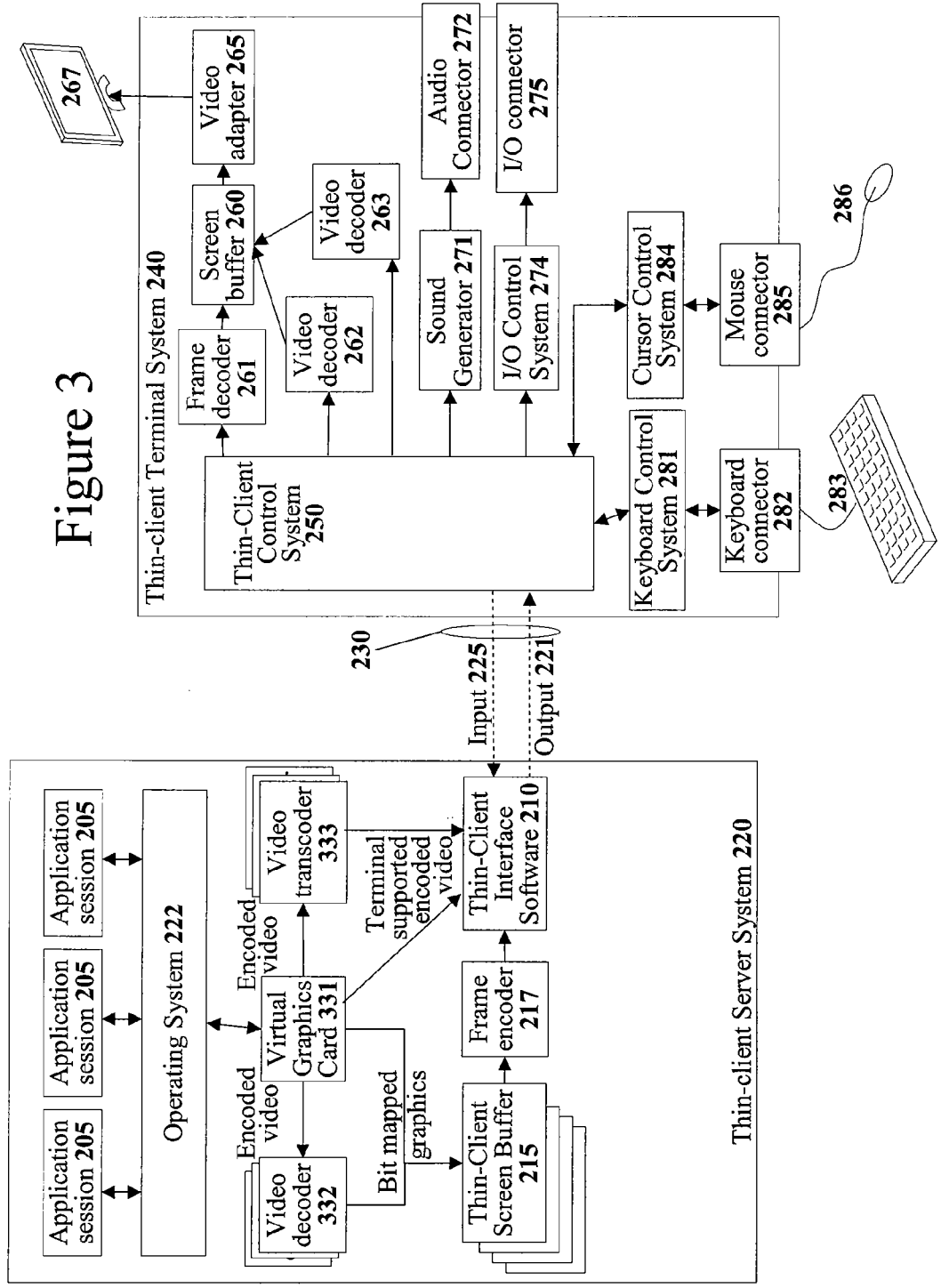
FIG. 3 illustrates a thin-client server computer system and thin-client terminal system that support video stream decoding at the thin-client.

The proposed video transport system will be disclosed with reference to FIG. 3 and FIG. 4. FIG. 3 illustrates a thin-client environment similar to that of FIG. 2A except that the advanced video system has been implemented in both the thin-client server 220 and the thin-client terminal system 240. FIG. 4 illustrates a flow diagram that describes how the thin-client server 220 in FIG. 3 operates to deliver video information to the thin-client terminal system 240.

Referring to FIG. 3, a thin-client server system 220 and a thin-client terminal system 240 are displayed. The thin-client terminal system 240 of FIG. 3 is the same as the thin-client terminal system 240 of FIG. 2A except that two video decoders 262 and 263 have been added. Other embodiments may have only a single video decoder or a plurality of video decoders. Note that by disabling the video decoders 262 and 263 thin-client terminal system 240 of FIG. 3 can operate in a backwards compatible mode such that it appears the same as the thin-client terminal system 240 of FIG. 2A.

The video decoders 262 and 263 are selected for ubiquity and low implementation cost in a thin-client terminal system architecture. If a particular video decoder is ubiquitous but expensive to implement, that video decoder may not be practical due to cost. However, decoders for very popular video encoding systems probably should be selected since the user experience will be greatly enhanced. If a particular video decoder is very inexpensive but only supports a rarely used digital video encoding system then such a video decoder is not likely selected since it is not worth the cost of adding a video decoder that will rarely be used.

The video decoders may be implemented with software run on a processor, as discrete off-the-shelf hardware parts, or as licensed digital video decoder cores that are implemented with an Application Specific Integrated Circuit (ASIC) or a Field Programmable Gate Array. In one embodiment, a licensed digital video decoder as a part of an Application Specific Integrated Circuit was selected since other portions of the thin-client terminal system could also be implemented within the same ASIC.

Server Side Support for the Video Transport System

Although the video decoders added to the thin-client terminal systems will improve the digital video experience for the thin-client terminal user, the video transport system would not be able to operate without a significant amount of video system support provided from within the thin-client server computer system 220 of FIG. 3. In order to keep the complexity and cost of the thin-client terminal systems low, much of the work required to provide support for a wide variety of digital video encoding systems is handled within the thin-client server system 220. One advantage of this approach is that upgrading the single thin-client server system 220 will provide improved performance to all the thin-client terminal systems supported by that thin-client server system 220.

Referring to the thin-client server system 220 of FIG. 3, the video system for supporting the thin-client terminal systems may include a virtual graphics card 331, digital video decoders 332, digital video transcoders 333, thin-client screen buffers 215, and video frame encoder system 217. Note that not all of these elements are required in every embodiment of the disclosed video transport system.

The virtual graphics card 331 acts as a control system for creating video displays for each of the thin-client terminal systems. In one embodiment, a virtual graphics card 331 is created for each thin-client terminal system supported by the thin-client server system 220. The goal of the virtual graphics card 331 is to output either bit-mapped graphics to be placed into the thin-client screen buffer 215 for a thin-client terminal system or to output an encoded video stream that is supported by the video decoder within a thin-client terminal system.

The video decoders 332 and video transcoders 333 within the thin-client server system 220 are used to support the virtual graphics card 331 in handling digital video streams. Specifically, the video decoders 332 and video transcoders 333 help the virtual graphics card 331 handle digital video encoding streams that are not natively supported by the digital video decoder(s) (if any) in thin-client terminal systems. The decoders 332 are used to decode video streams and place the data thin-client screen buffer 215. The transcoders 333 are used to convert from a first digital video encoding format into a second digital video encoding format. In this case, the second digital video encoding format will be a digital video encoding format natively supported by a target thin-client terminal device.

The transcoders 333 may be implemented as digital video decoder for decoding a first digital video stream into individual decoded video frames, a frame buffer memory space for storing decoded video frames, and a digital encoder for re-encoding the decoded video frames into a second digital video format. This enables the transcoders 333 to use existing video decoders on the personal computer system. Furthermore, the transcoders 333 could share the same video decoding software used to implement video decoders 332. Sharing code would reduce licensing fees.

Operation of the Video Transport System

To best describe the digital video system transport system of the thin-client server system 220 and thin-client terminal system 240, the operation of the digital video transport system will be described with reference to both the block diagram of FIG. 3 and a flow diagram illustrated in FIG. 4. Referring to the initial stage 410 of flow diagram of FIG. 4, when a thin-client terminal session for thin-client terminal system 240 is created within the thin-client server system 220 the thin-client server system 220 asks that thin-client terminal system 240 to disclose its graphics capabilities so the thin-client server system 220 will know how to handle video output for that particular thin-client terminal system 240. For example, the thin-client server system 220 may be informed about the display screen resolutions, color bit depth, and the video decoders supported by the thin-client terminal system 240. The thin-client server system 220 uses the video display information received from the thin-client terminal system 240 to initialize the virtual graphics card 331 for a terminal session with that thin-client terminal system 240 at stage 420.

After the terminal session has been initialized and the virtual graphics card 331 has been created, the virtual graphics card 331 is ready to accept display requests from the operating system 222 (or other entity responsible for delivering terminal session display requests). When a display request is received at stage 430 in FIG. 4, the virtual graphics card 331 first determines if the display request is related to a digital video stream or bit-mapped graphics at stage 440. Bit-mapped graphics may be any display request that does not concern a digital video stream such as the drawing of a line or the display of text. If a bit-mapped graphics display request is received then the virtual graphics card 331 proceeds to stage 445 and writes the bit-mapped pixels into the thin-client screen buffer 215 associated with the terminal session. In FIG. 3 this is illustrated as the "bit-mapped" graphics arrow from virtual graphics card 331 to the thin-client screen buffer 215. The video frame encoder 217 of the thin-client server computer system 220 will read the bit-mapped screen buffer 215 and encode information from bit-mapped screen buffer 215 for transport to the thin-client terminal system 240. The thin-client terminal system 240 will use that information to reconstruct a copy of bit-mapped screen buffer 215 within the screen buffer 260 of the thin-client terminal system 240.

Referring back to stage 440, if the display request received by the virtual graphics card 331 is a digital video stream then the virtual graphics card 331 proceeds to stage 450 in FIG. 4. At stage 450, the virtual graphics card 331 determines if the thin-client terminal system 240 associated with the digital video stream request has the appropriate video decoder capability to handle that particular digital video stream natively. If the associated thin-client terminal system 240 does have the appropriate video decoder capability, then the virtual graphics card 331 proceeds to stage 455 where it can send the digital video stream directly to the associated thin-client terminal system 240 since the thin-client terminal system 240 can use its local decoder to decode the digital video stream and render it locally. On FIG. 3, this is illustrated as an arrow of encoded video from the virtual graphics card 331 to the thin-client interface software 210 that passes the encoded video to the associated thin-client terminal system 240.

Referring back to stage 450, if the thin-client terminal system 240 associated with a digital video stream request does not have the appropriate video decoder for that digital video stream, then the virtual graphics card 331 proceeds to stage 460 to handle the digital video stream in an alternative manner. At stage 460, the virtual graphics card 331 determines if transcoding of the digital video stream is possible and desirable. Transcoding of a digital video stream is not be possible if the thin-client server system 220 lacks the needed resources to transcode the digital video stream into an encoded video stream that the video decoder in the thin-client terminal system 240 can handle. For example, needed transcoder 333 and/or decoder may not be available.

If transcoding of the video stream is deemed to be possible and desirable, then the virtual graphics card 331 proceeds to stage 465 where the video stream is sent to an appropriate transcoder 333 to transcode the digital video stream into an encoded video stream that the video decoder in the thin-client terminal system 240 can handle. This is illustrated in FIG. 3 as an arrow from the virtual graphics card 331 to the video transcoder 333. The transcoded video stream is then sent to the thin-client terminal system 240 as set forth in stage 455. On FIG. 3, this is illustrated as an arrow of encoded video from the video transcoder 333 to the thin-client interface software 210 that passes the encoded video to the associated thin-client terminal system 240.

Note that in some circumstances it may be possible to transcode a digital video stream from an unsupported video encoding format to a video encoding format supported by the video decoder in the thin-client terminal system 240 but not desirable to do so. Digital video transcoding can be a very difficult task that requires a lot of memory and significant processor resources. Thus, if the thin-client server computer system 220 is already experiencing a heavy processing load then it may not be desirable to transcode the digital video stream. In such situations, the system may refuse to handle digital video stream request or handle the digital video stream with the following alternate method.

Referring back to stage 460, if video stream transcoding is deemed to be not possible or not desirable (possibly due to a heavy processing load already on thin-client server computer system 220) then the virtual graphics card 331 may proceed to stage 470 to handle the digital video stream in a different manner. At stage 470, the virtual graphics card 331 sends the digital video stream to a video decoder 332 to decode the video stream. This is illustrated in FIG. 3 as an arrow of encoded video from the virtual graphics card 331 to the video decoder 332. The video decoder 332 decodes the video stream and writes the successive frames of video information into the appropriate thin-client screen buffer 215 for the terminal session. This is illustrated in FIG. 3 as an arrow of bit-mapped graphics from video decoder 332 to thin-client screen buffer 215.

As the video decoder 332 writes display information into the thin-client screen buffer 215, the video frame encoder 217 of the thin-client server system 220 will read that bit-mapped thin-client screen buffer 215 and transport that display information to the associated thin-client terminal system 240. Note that the video frame encoder 217 is generally not designed to handle full motion video such that video frames will likely be dropped thus causing a stuttering video display at the thin-client terminal system 240. Furthermore, the video frame encoder 217 may read from the thin-client screen buffer 215 while the video decoder 332 is simultaneously writing to that thin-client screen buffer 215 such that video frame tearing may occur. This particular method of handling digital video is thus not optimal but can be used if the thin-client server system 220 lacks a proper video transcoder 333 or the associated thin-client terminal system 240 has no embedded video decoder.

Note that all embodiments need not have all of the various different components disclosed. For example, a thin-client server system 220 could be constructed only with video transcoders 333. Or a thin-client server system 220 could be constructed only with decoders 332. A thin-client server system 220 with neither would only support video encoding systems supported by native video decoders in the terminal systems. A good implementation of a thin-client server system 220 would be implemented with a mixture of both video transcoders 333 and video decoders 332.

It should be noted that the system of FIGS. 3 and 4 provides optimal performance and optimal efficiency since different encoding systems are used depending on the situation. When standard bit-mapped graphics are displayed with infrequent updates, the video frame encoder 217 is used since it will send no information across the communication channel when there are no changes being made to the thin-client screen buffer 215. However, when full motion digital video needs to be displayed, the encoded digital video stream will be sent directly to the thin-client terminal system 240 if the thin-client terminal system 240 natively supports that particular video encoding system. If that video encoding system is not natively supported by the thin-client terminal system 240, then the video system will transcode the digital video stream into a digital video encoding system that is supported by the video decoder in the thin-client terminal system. Only if the thin-client terminal system 240 has no video decoder system or the thin-client server system 220 lacks the appropriate transcoder will a video decoder be used. Thus, the disclosed system always attempts to handle full motion video with a native video decoders or an appropriate video transcoder when ever possible.

The preceding technical disclosure is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. The abstract is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A method of communicating video information to a remote display system, said method comprising:
   receiving, by a virtual graphics card on a server system, display data for displaying on said remote display system,
   the virtual graphics card assigned to an application session executed on the server system for the remote display system;
   identifying whether said display data comprises a digital video stream or bit-mapped graphics, said digital video being encoded in a first encoding format;
   writing said display data to a frame buffer associated with said remote display system in response to identifying that said display data comprises displaying bit-mapped graphics; and
   in response to identifying that said display data comprises digital video stream:
      determining whether the remote display system can decode the video stream in the first encoding format;
      in response to a determination that said remote display system can decode said encoded digital video stream in the first encoding format,
         transmitting said digital video in the first encoding format to said remote display system by bypassing the frame buffer;
      in response to a determination that said remote display system cannot decode said encoded digital video stream in the first encoding format:
         determine whether the remote display system supports a second encoding format in response to a determination that the second encoding format is supported by the remote display system and in response to transcoding being available:
            transcoding said digital video stream to the second encoding format; and
            transmitting said transcoded digital video to said remote display system by bypassing the frame buffer; and
         in response to at least one of a determination that second encoding format is unsupported by the remote display system or transcoding being unavailable,
            decoding the digital video stream into bit-mapped graphics and writing the decoded bit-mapped graphics to the frame buffer assigned to the remote display system for transmission to the remote display system.

2. The method of communicating video information to a remote display system as set forth in claim 1, said method further comprising: transmitting the display data from said frame buffer for said remote display system to said remote display system.

3. The method of communicating video information to a remote display system as set forth in claim 1, said method further comprising: determining whether transcoding is available.

4. The method of communicating video information to a remote display system as set forth in claim 3: wherein determining whether transcoding is available is based on resources needed to perform transcoding not being present.

5. The method of communicating video information to a remote display system as set forth in claim 3 wherein the determining whether transcoding is available comprises determines determining that sufficient resources exist for performing transcoding.

6. The method of communicating video information to a remote display system as set forth in claim 1, said method further comprising: querying said remote display system to determine video decoding capabilities of said remote display system.

7. A system of communicating video information to a remote display system, said system comprising:
   a virtual graphics card assigned to an application session executed on the server system for the remote display system, the virtual graphics card to receive display data generated by the application session for displaying said remote display system;
   a video transcoder to transcode digital video from a first encoding format to a second encoding format; and
   a video decoder to decode digital video to bit-mapped images and to store the decoded bit-mapped images in a screen buffer stored on the server system and assigned to the remote display terminal, wherein in response to receiving display data, said virtual graphics to:
   identify whether said display data comprises digital video stream or bit-mapped graphics;
   write said display data to the screen buffer associated with said remote display system in response to identifying that said display data comprises bit-mapped graphics;
   and in response to identifying that the display data comprises digital video encoded in the first encoding format and that the first encoding format is supported by the remote display system,
   said virtual graphics adapter to transmit the digital video encoded in the first encoding format from said display request to said remote display system by bypassing the screen buffer in a system;
   in response to identifying that the display data comprises digital video encoded in the first encoding format and that the first encoding format is unsupported and the second encoding format is supported by remote display system and that the video transcoder is available, transcode the digital video to the second encoding format using the video transcoder and transmit the transcoded digital video to the remote display system by bypassing the screen buffer; and in response to identifying that the display data comprises digital video encoded in the first encoding format and at least one of a determination that the first and second encoding formats are unsupported by the remote display system or a determination that the video transcoder is unavailable, decode the digital video into bit-mapped graphics using the video decoder and write the decoded bit-mapped graphics to the screen buffer assigned to the remote display for transmission to the remote display.

8. The system of communicating video information to a remote display system as set forth in claim 7, said system further comprising: an interface module to transmit display data from said frame buffer or said transcoder to said remote display system.

9. The system of communicating video information to a remote display system as set forth in claim 7, wherein the virtual graphics card performs the determination of whether the video transcoder is unavailable.

10. The system of communicating video information to a remote display system as set forth in claim 9 wherein said determination that the first and second encoding formats are unsupported includes a determination that no appropriate video transcoder exists.

11. The system of communicating video information to a remote display system as set forth in claim 9 wherein said determination that the video transcoder is unavailable is based at least on there being insufficient resources for performing transcoding.

12. The system of communicating video information to a remote display system as set forth in claim 7 wherein said virtual graphics card queries said remote display system to determine video decoding capabilities of said remote display system.

13. The system of communicating video information to a remote display system as set forth in claim 12, wherein said virtual graphics card queries said remote display system requesting a list of encoding formats supported locally by the remote display system.

14. The system of communicating video information to a remote display system as set forth in claim 7, wherein the server system corresponds to a thin-client server of the remote display system.

15. A non-transitory, device-readable storage medium embodying instructions that, when executed by a device, cause the device to perform operations comprising:

receiving, by a virtual graphics card on a server system, display data for display on said remote display system, the virtual graphics card assigned to an application session executed on the server system for the remote display system;

identifying whether said display data comprises digital video or bit-mapped graphics, said digital video being encoded in a first encoding format;

writing said display data to a frame buffer associated with said remote display system in response to identifying that said display data comprises bit-mapped graphics; and in response to identifying that said display data comprises digital video:

determining whether the remote display system can decode the digital video in the first encoding format;

in response to a determination that said remote display system can decode said digital video in the first encoding format, transmitting said digital video in the first encoding format to said remote display system by bypassing the frame buffer;

in response to a determination that said remote display system cannot decode said digital video in the first encoding format:

determine whether the remote display system supports a second encoding format;

in response to a determination that the remote system supports the second encoding format and in response to transcoding being available:

transcoding said digital video to the second encoding format; and transmitting said transcoded digital video to said remote display system by bypassing the frame buffer; and in response to at least one of a determination that second encoding format is unsupported by the remote display system or transcoding being unavailable, decoding the digital video stream into bit-mapped graphics and writing the decoded bit-mapped graphics to the frame buffer assigned to the remote display system for transmission to the remote display system.

16. The non-transitory device-readable storage medium of claim 15 further embodying instructions that, when executed by the device, cause the device to perform operations comprising: transmitting the display data from said frame buffer for said remote display system to said remote display system.

17. The non-transitory device-readable storage medium of claim 15 further embodying instructions that, when executed by the device, cause the device to perform operations comprising: determining whether transcoding is available.

18. The non-transitory device-readable storage medium of claim of claim 17, wherein the determining of whether transcoding is available is based on resources needed to perform transcoding not being present.

19. The non-transitory device-readable storage medium of claim of claim 17, wherein the determining of whether transcoding is available comprises determining that sufficient resources exist for performing transcoding.

20. The non-transitory device-readable storage medium of claim 15 further embodying instructions that, when executed by the device, cause the device to perform operations comprising: querying said remote display system to determine video decoding capabilities of said remote display system.

* * * * *